Patented Sept. 11, 1951

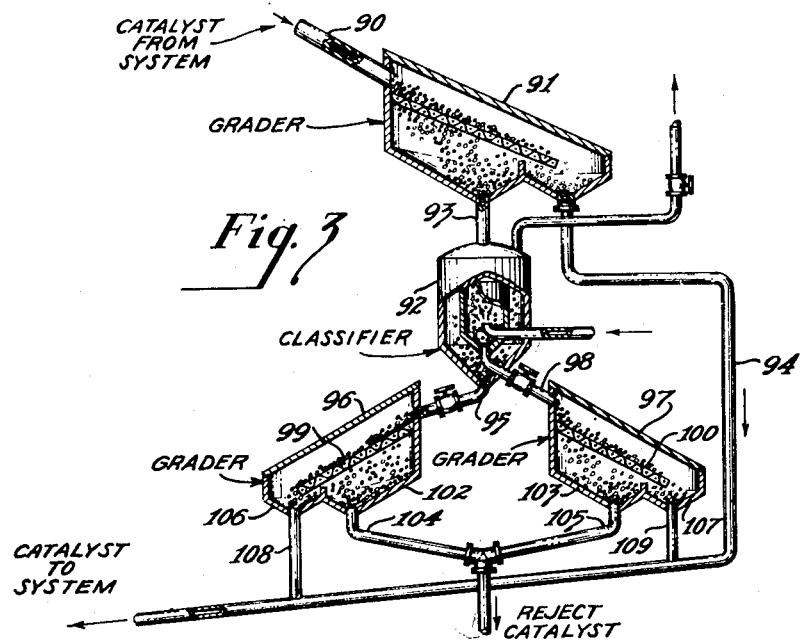
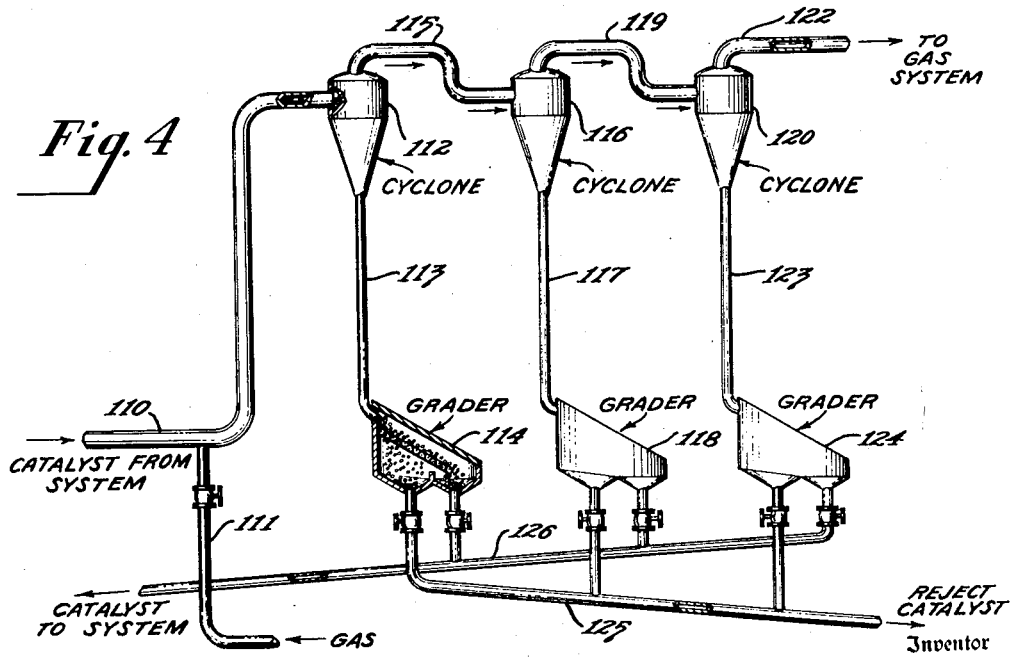

2,567,207

UNITED STATES PATENT OFFICE

2,567,207

MAINTENANCE OF CATALYTIC ACTIVITY IN HYDROCARBON CONVERSION SYSTEMS

Albert Wesley Hoge, Ridley Park, Pa., assignor to Houdry Process Corporation, Wilmington, Del., a corporation of Delaware Application January 21, 1947, Serial No. 723,365

1 Claim. (Cl. 196—52)

This invention relates to processes in which fluids are contacted by particulate contact masses and is especially concerned with hydrocarbon conversion processes, such as cracking, in which solid catalysts are used.

In the catalytic conversion of hydrocarbons under cracking conditions using solid refractory catalysts, hereinafter referred to as catalytic cracking, the original hydrocarbons are converted to hydrocarbons of different molecular weight or structure or both in the presence of a contact mass comprising a cracking catalyst. The catalyst is preferably and generally a porous refractory solid having catalytic cracking activity such as an activated clay of montmorillonite type or a synthetically produced porous contact mass generally comprising a plurality of refractory metal oxides as, for example, a plurality of the oxides of silicon, aluminum, magnesium, thorium, zirconium and the like. During the catalytic cracking operation, the cracking catalyst, which directs and accelerates the hydrocarbon conversion reactions, concomitantly accumulates a deposit of hydrocarbonaceous material commonly referred to as coke. Since the deposit of coke diminishes the efficiency of the catalyst, the catalyst is periodically regenerated by contacting it with an oxidizing gas. After regeneration of at least a portion of the coke deposit, the catalyst is suitable for reuse and the cycle of operations can be repeated.

In regeneration procedures commonly used, the temperature of the catalyst increases markedly during regeneration. Commercial operations are generally effected under conditions, such as by the use of indirect heat exchange, so as to restrict the maximum temperatures of regeneration to safe levels as, for example, about 1100° F. It has been observed, however, that, in spite of precautions, the activity of catalysts used in either fixed bed or moving catalyst systems gradually (and sometimes rapidly) decreases. In fixed bed systems, the catalyst is replaced when it has declined to an uneconomical activity while it is common practice in the operation of moving catalyst systems continuously to add catalyst to the system while withdrawing used catalyst at a predetermined rate. As a result, the catalyst is maintained at an activity somewhat lower than the activity of fresh catalyst.

The equilibrium activity of the contact mass in a moving catalyst system is usually the result of the balance in the rate of deterioration of the catalyst (due to the conditions of regeneration, the character of the charge stock and other factors) and the rate at which catalyst in the system is replaced by fresh catalyst. It is the practice to add fresh catalyst in an amount equal to the amount of catalyst which has been reduced to such fineness that it is either deliberately removed from the system to avoid mechanical difficulties in the flow of the contact mass or is lost from the system by entrainment in flue gases and the like. The total catalyst added to compensate for catalyst removed or lost is referred to as catalyst make-up. The resultant mixture of fresh and used catalyst has an activity, as measured under standard conditions in terms of the production of desired products, such as gasoline when the contact mass is used for cracking, which is somewhat less than the activity of the fresh catalyst. For constant operating conditions including replacement of a fixed percentage of the catalyst in the system, the rate of increase of catalyst activity due to addition of fresh catalyst will equal the rate of deterioration of the entire catalyst in the system for only one value of the activity of the mixture of fresh and used catalyst; this value is referred to as the equilibrium activity, and the mixture of fresh and used catalyst as the equilibrium catalyst.

I have discovered, in accordance with my invention, that, when using solid hydrocarbon conversion catalysts that decline in catalytic activity when subjected to temperatures above 1000° F., I obtain improved results when I effect conversion of hydrocarbons, such as by cracking, under conversion conditions in the presence of a relatively low density portion of a contact mass comprising particles of said solid conversion catalyst previously subjected to temperatures above 1000° F., which low density portion has been obtained by removing from the total contact mass a fraction whose average particle density is higher than that of the total contact mass and which comprises particles of said catalyst substantially higher in density than particles of fresh catalyst. I have found that such a low density portion of the contact mass has an increased catalytic activity for hydrocarbon conversion relative to the total contact mass, whereas the fraction so separated, which comprises particles that are relatively dense in comparison to the total contact mass or to fresh catalyst on the basis of either bulk or apparent density or particle density, is relatively low in catalytic activity when compared to the total contact mass. After removal of a relatively dense fraction from a contact mass used for hydrocarbon conversion, I may further improve the catalytic efficiency of the remaining contact mass by adding to it fresh, relatively high activity catalyst.

It has now been found that when contact masses comprising particles of cracking catalyst are subjected to repeated cycles of operation including cracking, regeneration, and purging periods such as is encountered in commercial moving bed systems, the catalytic activity and density of the particles are related in a definite manner for each such system, the density increasing as the activity decreases. This relationship is particularly simple in the higher range of densities and lower range of activities, and is thought to result from aging due to the particular operating conditions encountered. The relationship may be simple in many cases because many commercial catalysts which are charged to moving beds have been previously treated for purposes of resistance to attrition so as to be at or near the breakpoint (i. e., the point where further increase in density causes a marked decrease in activity). In any event, when a contact mass which has been used in a catalytic cracking system and which comprises a mixture of fresh and used catalyst, is, in accordance with the invention, subjected to separation so as to remove a fraction having an average bulk density higher than the contact mass and at least 15% higher than the density of the fresh catalyst, the remainder of the contact mass has an improved catalytic activity. When a greater improvement in activity is desired or the contact mass has been used so that the equilibrium activity is low, or when the fresh catalyst has a density which is, for the treating conditions in the particular conversion system, below the breakpoint, it is preferred to subject the contact mass to separation so as to remove a fraction comprising particles having a density at least 25% higher than the fresh catalyst.

In a preferred embodiment of my invention involving moving catalyst systems, I continuously withdraw from the main body of the contact mass circulating within the catalytic cracking system a portion thereof, and separate from the withdrawn contact mass a relatively high density fraction. The contact mass thus processed has a catalytic efficiency higher than the main body of contact mass to which it is returned and thus serves to increase the catalytic efficiency of the main body of contact mass. At the same time, I may add fresh relatively high activity catalyst to the main body of contact mass and thus obtain the twofold effect of further enhancing the catalytic efficiency of the main body of catalyst and, where it is desirable, maintaining the volume of the main body of the catalyst substantially constant by such an addition. By operating the above described process continuously, I maintain the main body of contact mass at a high level of cracking efficiency with a minimum amount of added catalyst.

The portion of the contact mass withdrawn for the removal of a relatively high density fraction may be processed according to well known methods for the separation of relatively dense particles from relatively less dense particles. I may withdraw from the main body of contact mass a portion which consists of particles of a limited range in size, and thereafter separate this fraction according to the mass of the particles by various methods of pneumatic classification, such as separation of the dense particles by use of a stream of gas such as air or flue gas. Alternatively, I may withdraw a portion of the main body of catalyst, then grade the withdrawn portion according to size and thereafter separate one or more of such graded fractions according to the density of the various particles thus obtaining one or more relatively dense, low activity fractions or I may subject the withdrawn portion to pneumatic classification and thus obtain fractions comprising relatively dense particles of relatively small size and relatively less dense particles of relatively greater size and thereafter grade one or more of such fractions according to the size of the particle and obtain one or more final fractions comprising a high concentration of relatively dense low activity particles. I may also use other methods for the separation of the relatively more dense particles, such as vibrating inclined tables, or I may, after cooling the withdrawn portion of catalyst, use hydraulic methods of separation such as wet elutriation methods or flotation methods.

The relative amount of catalyst withdrawn from the main body of catalyst circulating in a fluent catalyst cracking system will depend on the rate at which the catalyst deteriorates under the existing operating conditions and on the desired level of equilibrium activity. Although it is generally preferred to withdraw a portion of catalyst continuously, it may, at times, be desirable to effect intermittent withdrawal. It is within the scope of this invention to separate from the main body of catalyst a fraction, the particles of which average higher in density than the main body of catalyst, and which is more concentrated in dense particles than the main body of the catalyst but contains particles which are less dense and have relatively high activity. More exact separation may be made on a series of fractions closely graded as to size, or the separation may be repeated a number of times and thus a fraction obtained which has a high concentration of the most dense and least active particles in the system. The extent of concentration of the most dense particles in the fraction removed may be varied between wide limits, in accordance with the invention, as, for example, the fraction removed may contain about 10 volume per cent of particles having a density at least 50% higher than the fresh catalyst or it may contain 90 volume per cent or greater of particles having a density at least 20% higher than the fresh catalyst.

I may withdraw the portion of the main body of catalyst which is to be divided into more dense and less dense portions from various points in the cracking system and gain advantages peculiar to the point of withdrawal. I may withdraw freshly regenerated catalyst before such catalyst returns to the reaction zone, separate a low activity fraction and add the remainder to the main stream of catalyst which has emerged from the regeneration zone, the addition taking place prior to the entrance of the catalyst to the reaction zone. In connection with such a process, I may use a cool gas to separate the withdrawn portion and thereby cool the catalyst returned to the system. Admixture of this cool catalyst with the catalyst stream passing to the reaction zone permits operation of the regeneration zone so that the catalyst may leave that zone at a higher temperature for the same temperature of introduction of the catalyst stream to the reaction zone, thereby reducing the amount of cooling effected in the regeneration zone. Such an operation permits an increase in the flow of contact mass through the regeneration zone at a constant percentage of coke or an increase in the percentage of coke at constant throughput of contact mass or a reduction in the amount of equipment necessary for a given amount of coke burned. In addition, if cool air is used in the separation process, it is at least partially heated for subsequent use as a regeneration medium. At any event, an increase in the thermal efficiency for the entire system will result.

In one embodiment of the invention, partially regenerated fluent contact mass comprising particles of a solid cracking catalyst may be withdrawn from a regeneration zone of a cracking system and thereafter fractionated so as to obtain a low activity fraction comprising relatively dense, low activity particles, the partially regenerated contact mass being contacted with an oxidizing gas during the course of the fractionation and being thereby more completely regenerated. This method results in a decreased amount of coke burned in the regeneration zone proper, with resultant savings in the equipment needed or operation of the regeneration zone or both. When the partially regenerated contact mass is contacted with an oxidizing gas as described above, the concentration of oxygen in the oxidizing gas or its temperature or both are regulated so as not to exceed the safe temperature of regeneration of the cracking catalyst being used. Thus, when air is used as the oxidizing gas, it may be diluted with flue gas which is partially or wholly depleted of its oxygen content, or flue gas partially depleted of its oxygen content may be used alone to effect a desired amount of combustion of the coke deposit. The contact mass may subsequently be contacted with cool oxidizing gas so as to effect cooling of the contact mass which may then be returned to the regeneration zone proper to effect cooling therein.

Alternatively, all or part of the contact mass from the reaction zone may be processed using a stripping gas, such as steam or flue gas, as a classifying means and thereby, at the same time, both strip the catalyst of volatile hydrocarbons in preparation for regeneration and classify the catalyst into a relatively more dense and a relatively less dense fraction, the latter being passed on to the regeneration zone while the former is removed from the catalytic cracking system. In the event that only a portion of the contact mass from the reactor is so treated, the remainder of the contact mass is purged in the customary manner prior to regeneration.

In order to understand the invention more fully, reference should be had to the drawings which illustrate various embodiments of the present invention, which invention is not, however, limited in scope thereto. These embodiments will be described in connection with operations in which a fluent refractory contact mass in molded or aggregated form, such as pellets or spheres, is circulated by gravity through either or both reaction and regeneration vessels. One such system employs downwardly moving non-turbulent beds of catalyst in the reaction and regeneration zones. The application of this type of system to cracking operations has been described in various published articles (see, for example, "The 'T. C. C.' Cracking Process For Motor Gasoline Production" by R. H. Newton, G. S. Dunhan and T. P. Simpson, "Transactions Of The American Institute Of Chemical Engineers," volume 41, page 215, April 25, 1945, and the articles there cited) and hence will not be repeated here. Although the drawings exemplify one type of moving contact mass operation, the present invention may be embodied in other types of operations which use fluent solid contact masses, or may be applied to processes involving fixed bed operations. In the drawings, which are schematic flow diagrams in which details of conventional auxiliary equipment have been omitted for clarity:

Fig. 3 shows separation equipment, illustrating an embodiment involving a plurality of separation steps.

Fig. 4 shows another type of separation equipment, illustrating another embodiment of the invention involving a plurality of separation steps.

Figure 1:
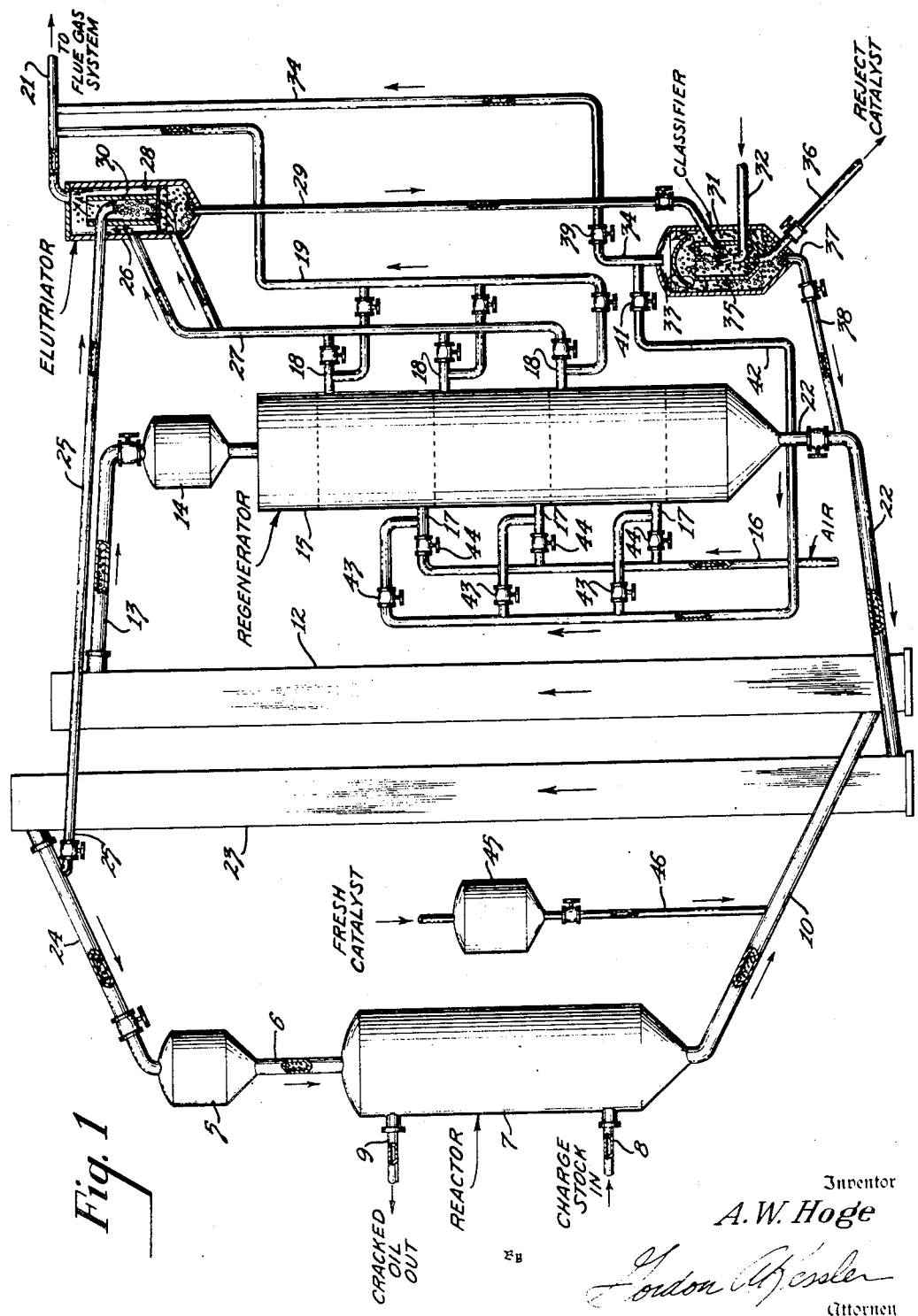
Fig. 1 shows a complete cracking system, illustrating one embodiment of the present invention in which the catalyst is separated after regeneration is completed.

In Fig. 1, a catalyst of the type used in cracking operations and discussed more fully below, such as a low alkali content silica-alumina gel or a catalytically active clay, which has been charged to the system preferably in the form of granules, pellets or beads of about 3 to 8 mesh, is fed from hopper 5 through catalyst leg 6 to reactor 7 where a moving bed of catalyst is contacted with a hydrocarbon charge stock, such as a virgin or cracked naphtha or gas oil, the charge stock being introduced to the reactor by line 8 after having been previously heated to the desired temperature. The charge stock is cracked by subjecting it to cracking conditions in reactor 7 and is thereafter removed by line 9 for further processing, such as a separation of various products as gasoline, solvent naphtha, fuel oil, recycle gas oil, and the like. The catalyst, which accumulates a coke deposit as a result of the cracking reaction, is purged of volatile hydrocarbons in a purging section at the bottom of reactor 7 (not shown) and thereafter passes by line 10 to elevator 12 from which it is conveyed by line 13 to hopper 14. The catalyst is fed from hopper 14 to regenerator 15 which may be a kiln comprising a plurality of burning and cooling sections or zones (which may extend between the dotted lines in regenerator 15). Such a kiln is described in the article cited. Controlled amounts of air from manifold 16 are introduced to the regenerator by lines 17 to the various sections of the kiln. Spent flue gases are removed by lines 18 and manifold 19, thereafter passing to line 21 and thence to the flue gas system. The flue gas system may be equipped to recover waste heat and to remove any fine particles of catalyst entrained by the flue gases. The catalyst, after regeneration by removal of at least a portion of the coke deposit, is removed from regenerator 15 by line 22 which conveys the catalyst to elevator 23. Elevator 23 conveys the catalyst to line 24 for charging into hopper 5.

A portion of the main body of the catalyst in line 24 may be conveyed by line 25 to elutriator 26. The catalyst emerging from the end of line 25 encounters in cylindrical member 30 a portion of the flue gases introduced to the elutriator by line 27, the other portion of the flue gases passing up annular space 28; the relative amounts of the two streams of gas being controlled by butterfly valves (not shown). Alternatively, air, which may be heated if desired, or flue gases from any suitable source, may be used in this connection. The downwardly descending catalyst is stripped of fine particles by the upwardly ascending stream of flue gases which may then pass to the flue gas system for removal of the entrained fine particles. It is preferred to maintain a velocity of flue gas such that fine particles of less than about 10 mesh are removed from the catalyst. The remainder of the catalyst, stripped of fines, accumulates in the bottom of the elutriator and passes by line 29 to classifier 31.

The catalyst from line 29 is discharged into an upwardly moving stream of gas introduced to the classifier by line 32, the velocity of the ascending stream being maintained such that a separation of the catalyst from line 23 is effected; the particles of greater mass dropping downwardly, while the particles of lesser mass are carried upwardly by the ascending stream of gas. The ascending stream of gas is deflected by baffle 33 and is decreased in velocity in the larger space above member 35, so that the catalyst particles continue downwardly while the gas, free of catalyst, passes upwardly and out of the classifier by line 34. The particles of greater mass which have accumulated at the bottom of member 35 are removed by line 36 for rejection from the system or further processing if desired. This portion of the catalyst comprises the relatively more dense particles together with some of the larger, but somewhat less dense, particles, and has a catalytic cracking activity less than that of the main body of the catalyst circulating in the system. The particles of lesser mass accumulate in the bottom of the classifier from which they are removed by line 37 and thence returned by line 38 to the main stream of catalyst in line 22.

The gas introduced by line 32 for the separation of catalyst may be spent flue gases either completely or partially depleted of free oxygen content, or may be unused air. If the gas introduced by line 32 was originally a flue gas, it may be removed from the classifier by line 34 and passed to the flue gas system. If, however, the gas introduced by line 32 is either unused air or gas high in oxygen content, it may be used in the regenerator by closing valve 39 and opening valve 41, thus passing the gas through line 42 to the kiln; if desired, any fines may be removed by passing through a cyclone separator. Such gas may be used in any amount in any section of the kiln by the proper adjustment of valves 43 and valves 44. When such a gas is used in classifier 31, it may be introduced to the classifier at a relatively low temperature and thereby cool the catalyst and preheat the air for introduction into the kiln. The cooled catalyst, on admixture with the main body of catalyst in line 22, cools the main body of catalyst, thus allowing the catalyst to be discharged from the regenerator at a higher temperature without increasing the temperature of introduction of the catalyst to the reaction zone. The cooling effect of the classified catalyst removes a portion of the cooling load in regenerator 15.

The catalyst removed from line 24 for classification may either be a representative portion of the entire mass or it may preferably be a portion limited in the range of size of the particles. The well known stratification of a mass of particles graduated in size as such a mass moves down a sloping tube, such as line 24, may be utilized to obtain a portion of the catalyst having predominantly a preselected narrow range of particle size, such as a range of 7 to 9 mesh. When the portion of the catalyst removed from line 24 is thus limited in the range of sizes of the particles included, the efficiency of the classification in classifier 31 is increased. Under these conditions it may be advisable to convey the catalyst directly to the classifier without passing through elutriator 28, the fines being removed from the system by the elutriation of a separately withdrawn portion of the contact mass.

Fresh catalyst may be added to the system to compensate for the catalyst rejected in classifier 31 and catalyst fines removed in the elutriator 26. Such fresh catalyst can be added at any appropriate point in the system, as for example, it may be added conveniently from hopper 45 through line 46 to the catalyst in line 10 which is passing to the regenerator. The amount of catalyst in the system may be conveniently varied by varying the rate of additional fresh catalyst so that it is either greater or less than the total amount of catalyst removed from the system.

The types of operations performed in reactor 7 are well known to the art and may include various hydrocarbon conversion processes typified by the concomitant accumulation of a carbonaceous deposit on the catalyst. Such processes include the cracking in mixed, liquid, or vapor phase of high boiling charge stocks to lower boiling products such as gasoline, the desulphurization of gasolines, naphthas and fuel oils, the reforming of natural or cracked gasolines and naphthas, visbreaking of relatively high boiling charge stocks and the like. The conditions of operation, such as direction of feeding the charge stock, temperatures, pressures, space velocity, and the like, for such processes are well known and need not be repeated here.

Various catalysts, particularly silicious cracking catalysts, may be employed in conjunction with the present invention, the criterion of use in connection therewith being that, under the conditions of operation encountered in the hydrocarbon conversion system, at least a portion of the catalyst in the system shall, with continued use, progressively decrease in activity and increase in density, the lease active particles in the system being the most dense. It has been found, as hereafter shown and as discussed above, that cracking catalysts can be subjected to conditions which increase the density without substantially decreasing the activity (in some cases, even increasing it). (The measurement of density, as herein referred to, is on the basis either of bulk or apparent density which is the weight of a well packed mass of particles per unit volume or of particle density which is the weight of a single particle divided by its volume including those voids within that particle accessible to liquid penetration. The former basis is preferred for convenience in measurement but the latter is a useful basis where the contact masses compared pack differently.) However, as the severity of treatment is increased and the density increases, a breakpoint is reached and thereafter the catalytic activity declines rapidly as the density increases. Other types of treatment which increase the density, particularly those involving the presence of steam, tend to decrease the activity as soon as the density increases and the phenomenon of the breakpoint is generally absent. Whether or not the phenomenon of the breakpoint is present, after the catalytic activity has declined about 10 to 15%, the relationship between the catalytic activity and the density is generally simple and definite in the lower range of activities (less than 75% of the maximum activity) and in the corresponding upper range of densities under similar aging or operating conditions. These effects may occur whether the catalyst is synthetically produced, as by forming a colloid mass, treating the colloid mass to remove undesirable components and calcining the treated colloid mass or is an activated natural product, such as a natural aluminosilicate.

The following tables illustrate the effects discussed above, the catalytic activity being expressed therein as the volume percentage of gasoline (referred to the volume of charge stock) produced by cracking a standardized charge stock under standardized cracking conditions (for details of this test, known as the "CAT-A" test, see "Laboratory Method For Determining The Activity Of Cracking Catalysts" by J. Alexander and H. E. Shimp, page R-537, National Petroleum News, August 2, 1944). The data shown in these tables were obtained by subjecting samples of catalysts of the types indicated to accelerated aging tests, the temperatures involved being above 1000° F. In each case, the tests of each series (A, B, etc.) were conducted under comparable conditions, the severity of the test increasing (as by raising the temperature) as the test number increases (series F being smoothed data from a number of different runs).

The phenomenon of the breakpoint is illustrated by series A, D and E. It has been observed in other tests on these and similar catalysts, that the breakpoint is seldom sharp but is frequently a region where the activity decreases slowly (generally less than 5 to 10%) with increase in density. However, irrespective of whether or not the phenomenon of the breakpoint is present, all of the above data show that there is a range of densities in which an increase in density is accompanied by a fairly rapid decline in the activity. In the data shown, this region of rapid decline, considering the lower limit of density to be that at the breakpoint when this phenomenon is present, is such that an increase in density of about 15% is accompanied by a decrease in activity of between 15 to 40%, the rapidity of the decline depending on the type of accelerated aging and on the particular catalyst involved. In catalysts aged in commercial cracking systems, the results are similar; for example, a decline of about 30% in activity was observed for a 10% increase in density where silica-alumina gel beads were involved. When the increase in density is larger, such as about 25%, the decline in activity is even more marked, varying, for the catalysts in the above tables, from about 20 to 50%.

In an embodiment of the present invention, the equilibrium activity of a cracking catalyst employed in a fluent catalyst system, as, for example, a moving bed system employing catalyst particles averaging between 2 mesh to 50 mesh, is maintained above a "CAT-A" activity of at least

TABLE I
Synthetic silica-alumina catalyst

| | Molded Pellets | | | | | | Gel Beads | |
|---|---|---|---|---|---|---|---|---|
| Test No. | Bulk Density Kilo. Per Liter | Activity, Per Cent Gasoline | Test No. | Bulk Density, Kilo. Per Liter | Activity, Per Cent Gasoline | Test No. | Bulk Density, Kilo. Per Liter | Activity, Per Cent Gasoline |
| A-1 | 0.49 | 47.0 | B-1 | 0.53 | 45.7 | C-1 | 0.72 | 45.3 |
| A-2 | 0.57 | 46.8 | B-2 | 0.66 | 38.0 | C-2 | 0.76 | 36.0 |
| A-3 | 0.69 | 45.6 | B-3 | 0.87 | 25.0 | C-3 | 0.85 | 26.5 |
| A-4 | 0.85 | 35.6 | | | | C-4 | 0.95 | 20.5 |
| A-5 | 0.93 | 23.1 | | | | | | |

TABLE II
Activated clay

| Test No. | Bulk Density, Kilo Per Liter | Activity, Per Cent Gasoline | Test No. | Bulk Density, Kilo Per Liter | Activity, Per Cent Gasoline | Test No. | Bulk Density, Kilo Per Liter | Activity, Per Cent Gasoline |
|---|---|---|---|---|---|---|---|---|
| D-1 | 0.60 | 41.7 | E-1 | 0.70 | 42.6 | F-1 | 0.69 | 40 |
| D-2 | 0.61 | 44.5 | E-2 | 0.71 | 43.4 | F-2 | 0.74 | 35 |
| D-3 | 0.61 | 41.7 | E-3 | 0.92 | 23.4 | F-3 | 0.80 | 30 |
| D-4 | 0.74 | 32.2 | E-4 | 1.15 | 4.9 | F-4 | 0.91 | 20 |
| D-5 | 0.80 | 18.0 | | | | F-5 | 1.01 | 10 |

The synthetic silica-alumina catalysts referred to in above Table I were prepared by precipitating a colloidal mass of silica and alumina gels in an alkaline menstruum and thereafter treating the colloidal mass to remove at least part of the alkali metal ions present. The molded pellets were prepared by grinding and milling the dry gel, forming it into pellets and calcining the pellets so formed. The gel beads were prepared by precipitation in that form. The activated clay catalyst referred to in Table II is a commercial form of acid activated montmorillonite clay in the form of 3 to 8 mesh pellets. The variations in the densities of the starting materials (contrast A-1 and B-1, D-1 and E-1) resulted from differences in the prior processing.

25 and preferably above 30 by removing from the system a selected amount of relatively dense particles having a "CAT-A" activity of less than 25 and adding fresh catalyst of at least 40 "CAT-A" activity. The amount of such relatively dense catalyst removed may vary with the particular aging conditions of the system and with the average density of the catalyst removed, the amount being smaller as the density is increased. When the aging conditions in the system result in similar relationships between density and activity as shown by series B, a "CAT-A" activity of above 30 may be maintained by removing a sufficient amount of catalyst having a density at least 50% greater than the initial density. In the case of conditions similar to series A, D and E, removal of catalyst at least 20 to 30% more dense than the density at the breakpoint is preferred while in the case of conditions similar to series C and F, the catalyst removed should preferably be at least 15% more dense than the initial activity. It is apparent from the data, as has been found in commercial cracking systems, that the relationship between density and activity is simple and definite for a given set of operating conditions and that the equilibrium activity can be maintained at any desired level by removing from the contact mass circulating in the system a portion thereof which portion has a density exceeding that of the fresh catalyst by a predetermined amount, a particularly effective amount being at least 15%.

Figure 2:
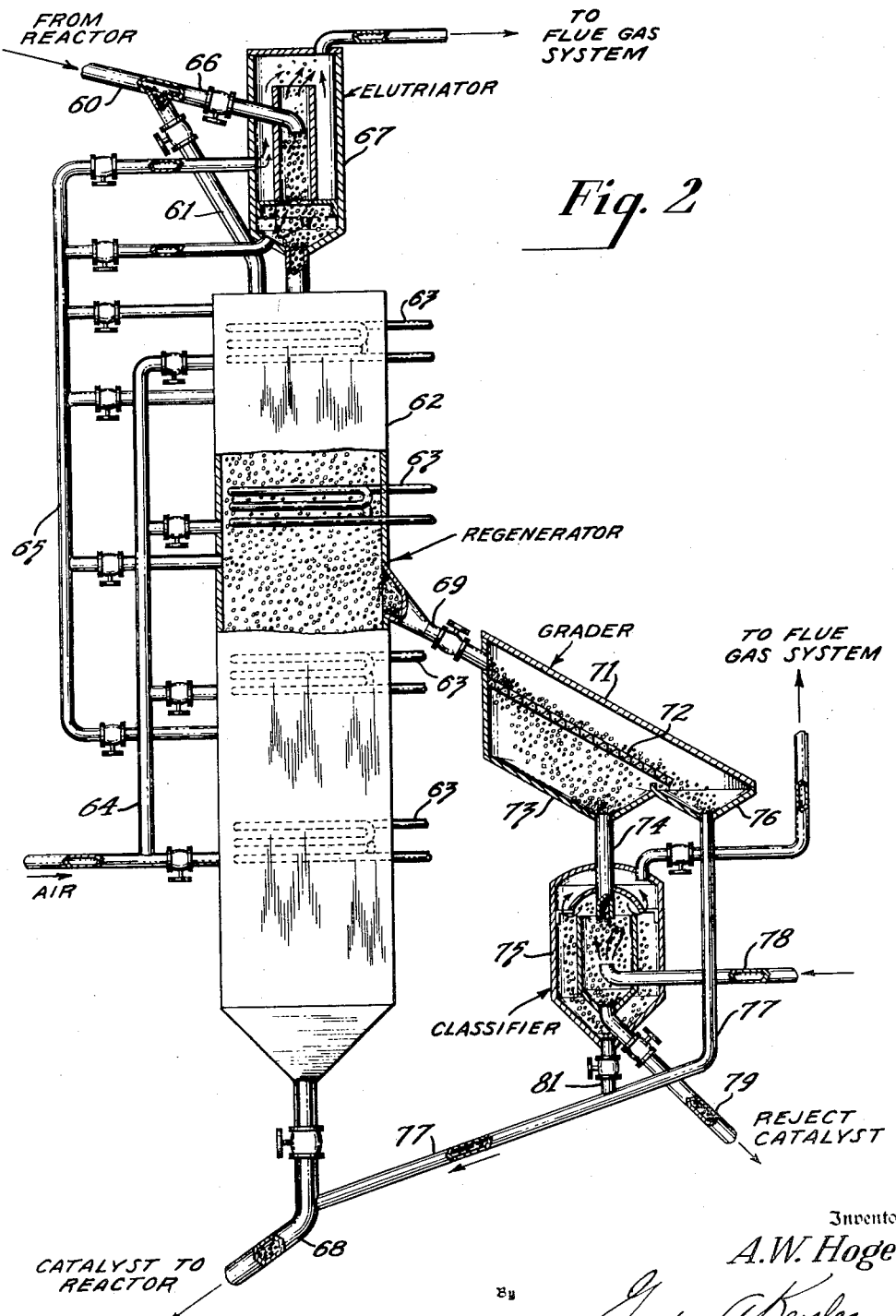
Fig. 2 shows the regenerating portion of a cracking system, illustrating an embodiment of the present invention involving apparatus used in regeneration and in which the catalyst is separated after partial regeneration.

In Fig. 2, in order to avoid repetition, only the regeneration zone with accessory equipment is shown, it being understood that a reactor, elevators, etc. are associated therewith. Coked catalyst from the reactor in line 60 passes by line 61 to kiln 62 and it is regenerated and treated therein as hereinafter described. Kiln 62 is a kiln similar to the regenerator 15 shown in Fig. 1. The regenerator is equipped with cooling coils 63 through which any suitable indirect heat transfer medium is passed and with an air inlet manifold 64 and a flue gas outlet manifold 65. These cooling coils are placed so as to obtain the most efficient cooling of the contact mass and may be placed below the air inlets. A portion of the catalyst in line 60 is conveyed by line 66 to elutriator 67, which is similar to elutriator 26 described in connection with Fig. 1, except that the catalyst, after elutriation, is passed to the regenerator to join the main body of catalyst in line 61. The catalyst, after passage through at least one and possibly two or more of the burning zones of the regenerator, is split into two streams, one stream continuing on through the regenerator for further regeneration and being removed by line 68, while the other stream is removed by line 69 for processing in grader 71.

The catalyst introduced to grader 71 by line 69 passes downwardly over sloping screen 72, which is of an appropriate size to grade the catalyst flowing over it into two fractions of greater and lesser size. An effective mode of operation is to use a screen which is slightly smaller than the size of the fresh catalyst, thus allowing catalyst which has been in the system a longer time and has hence been reduced in size by attrition, to fall through the screen. Screen 72 operates in the usual manner of grading screens and may be vibrated or otherwise agitated in order to effect a more efficient separation of the smaller catalyst particles which fall through the screen into chamber 73 from which they are removed by line 74 and conveyed to classifier 75; the coarser particles being collected in chamber 76 and passing by line 77 to line 68 in which they are mixed with the main body of catalyst. The smaller particles introduced to classifier 75 by line 74 are contacted as they fall downwardly by an upwardly ascending stream of gas introduced to the classifier by line 78. Classifier 75 is operated in a similar manner to that of classifier 31, the particles of greater mass being removed by line 79 and the particles of lesser mass by line 81. The particles in line 81, which are averagely less dense and more active than the particles in line 79, may be mixed with the previously graded particles in line 77 and thereafter passed to the main body of catalyst in line 68.

The catalyst removed from the regenerator by line 69 is preferably only partially regenerated and is therefore preferably contacted in classifier 75 with a gas having some oxidizing power. The amount of oxygen and the temperature of the gas introduced by line 78 are regulated according to the amount of coke on the catalyst contacted. By proper regulation of the temperature and oxygen content of this gas, it is possible to maintain combustion of the remaining coke deposit on the catalyst in the classifier 75 without exceeding a desired operating limit of temperature for the catalyst. In some cases, it may be desirable to use a gas whose temperature is such that the catalyst leaving the classifier by line 81 is somewhat cooler than the main body of catalyst. By means of the operation described above, the heat load on the regenerator is accordingly reduced and the regenerator may thereby be made smaller or may handle a greater quantity of catalyst without exceeding safe or desired operating limits.

Fig. 3 illustrates another embodiment of the invention in which the efficiency of separation is increased by additionally grading the catalyst after it has been classified in the manner shown in Fig. 2. The catalyst withdrawn from any desired point in the system is introduced by line 90 to grader 91 which operates in a similar fashion to grader 71, the small particles being passed to classifier 92 by line 93 while the coarser particles are returned to the system by means of line 94. Classifier 92 is operated in a similar fashion to classifier 75. In this case, however, particles of lesser mass removed by line 95 are passed to a grader 96 in which the smaller particles are separated from the larger particles. Grader 97 is used in a similar fashion to separate the particles of greater mass removed from the classifier by line 98. The use of graders 96 and 97 increases the efficiency of separation of the relatively dense particles inasmuch as the separation in classifier 92 is made more or less on the basis of the mass of each particle. As a consequence, the fractions into which the catalyst are separated will contain a range of sizes, the more dense particles being of smaller size and the less dense particles being of greater size. In graders 96 and 97 the more dense particles of lesser size fall through screens 99 and 100 respectively, being collected in chambers 102 and 103 from which they are removed by lines 104 and 105. The relatively less dense particles of greater size accumulate in chambers 106 and 107, being removed therefrom by lines 108 and 109. The catalyst in lines 108 and 109 is admixed with the catalyst in line 94 and thereafter returned to the catalytic cracking system.

Fig. 4, like Fig. 3, illustrates an embodiment of the invention in which a plurality of separating steps are used, the catalyst being withdrawn from any portion of the system. The catalyst withdrawn from the system by line 110 is swept upwardly by gas introduced by line 111 to cyclone separator 112. In separator 112 the particles of greater mass drop out of the flowing stream of gas and are removed from the separator by line 113 which passes to grader 114. The stream of gas sweeps the majority of the catalyst particles out of the cyclone separator and through line 115 to a second separator 116 which is so designed that particles again drop out of the stream of gas. The particles thus removed from the stream of gas are then removed from separator 116 by line 117 and passed to grader 118. The stream of gas now containing only the particles of relatively low mass pass by line 119 to separator 120 where again catalyst particles are removed. The stream of gas, as it leaves separator 120, carries with it only the finest of the particles and is accordingly sent to a gas treatment system where these fine particles are removed by appropriate devices such as Cottrell recipitators. The various fractions of catalyst removed from the various separators by lines 113, 117 and 123 are processed in graders 114, 118 and 124 in a similar fashion to that described above. The less active catalyst is removed from the various graders and is passed from manifold 125 to storage or appropriate disposal. The more active less dense particles are removed from the various graders as shown and are combined in manifold 126 and are thence passed to the system.

In order to illustrate the present invention but not to be construed as a limitation thereof, the following examples are given:

EXAMPLE I

A portion of equilibrium catalyst which had a "CAT-A" activity of 28.8 and which has been removed from a moving catalyst system to which fresh acid activated montmorillonite clay catalyst pellets (about 3 to 8 mesh in size and having a density of about 0.7 kilogram per liter and a "CAT-A" activity of about 40) had been added as catalyst make-up was processed so as to remove particles smaller than 8 mesh. The remaining contact mass was separated into relatively more dense and relatively less dense fractions. The amounts and properties of the various fractions were as follows:

| Fraction | Weight Per Cent Of Total Contact Mass | "CAT-A" Activity, Volume Per Cent Of Gasoline | Bulk Density, Kilograms Per Liter |
| --- | --- | --- | --- |
| Fines (less than 8 mesh) | 35.0 | 26.4 | 0.895 |
| More Dense Fraction | 25.2 | 9.4 | 0.99 |
| Less Dense Fraction | 39.8 | 31.5 | 0.82 |

It is apparent that the removal of a portion of the contact mass having a density of more than 20% greater than the fresh catalyst increased the activity of the remainder of contact mass to over 30 as measured by the "CAT-A" test, and that removal of a fraction approximately 40% more dense than the fresh catalyst removes that portion of the contact mass which is virtually inactive.

Example II

A similar contact mass, whose properties are given below, from a similar source as in Example I was separated into frictions having the following properties:

| Fraction | Weight Per Cent Of Total Contact Mass | "CAT-A" Activity, Volume Per Cent Of Gasoline | Bulk Density, Kilograms Per Liter |
| --- | --- | --- | --- |
| Original | 100 | 25.6 | 0.856 |
| Fraction 1 | 13.0 | 30.9 | 0.770 |
| Fraction 2 | 64.0 | 26.1 | 0.812 |
| Fraction 3 | 23.0 | 13.4 | 0.980 |

As may be seen by contrasting fractions 2 and 3, increasing the extent of separation according to density increases the efficiency of the process by isolating for removal very inactive material. Thus, fraction 3, which has a density of about 40% greater than the fresh catalyst and about 14% greater than the equilibrium catalyst, has an activity of only about half that of the equilibrium catalyst and about one-third that of fresh catalyst and is therefore very desirable material to remove from the remainer of the material. Removal of only fraction 3 from the contact mass would result in improved efficiency but an additional increase in efficiency will result by further separation of fraction 2 according to density.

The present invention includes within its scope various hydrocarbon conversion processes which involve solid catalysts; for example, dehydrogenation, in which coprecipitated plural gels such as chromia-alumina may be used; polymerization, in which synthetic silica-alumina catalysts may be used; and the like.

Inasmuch as many modifications and variations of the invention as hereinbefore set forth may be made without departing from the spirit and scope thereof, only such limitations should be imposed on the invention as are indicated in the appended claim.

I claim as my invention:

In a hydrocarbon conversion system wherein fluent particles of solid hydrocarbon conversion catalyst graduated in size contact process fluids in repeated cycles of operation at relatively high temperatures, said repeated cycles of operation comprising passage of said particles through a hydrocarbon conversion zone as a downwardly moving non-turbulent bed which contacts hydrocarbon fluids so as to form hydrocarbon products with the concomitant deposition of coke on said particles, transfer of coked particles from the conversion zone to a regeneration zone, passage of particles from the conversion zone through said regeneration zone as a downwardly moving non-turbulent bed which contacts an oxygen-containing gas under combustion conditions such that said particles are heated to a temperature substantially above the temperature in said conversion zone, removal of regenerated particles from said regeneration zone and conveyance of particles of regenerated catalyst to an elevation above said conversion zone: the improvement which comprises withdrawing a portion of the hot particles of catalyst in the stream of particles of regenerated catalyst passing from said elevation above said conversion zone to said conversion zone; contacting said portion of particles so withdrawn with a flowing stream of cool oxygen-containing gas so as to heat said gas and so as to cool said portion and to separate it into a relatively less catalytically active fraction comprising particles of said catalyst which are higher in apparent particle density and lower in catalytic activity than the catalyst in said system because of relatively high temperatures and contact with process fluids occurring during said repeated cycles of operation and a cooled relatively more catalytically active fraction whose average apparent particle density is lower than that of said portion; passing gas heated by contact with said portion of hot particles of regenerated catalyst without cooling to said regeneration zone for use therein; mixing said cooled relatively active fraction with hot particles of regenerated catalyst discharged from the regeneration zone at a temperature substantially above the temperature of introduction to the conversion zone so as to cool said hot particles of regenerated catalyst to the temperature of introduction to the conversion zone; and directing the mixture of said relatively active fraction and particles from the regeneration zone to the conversion zone for use therein.

ALBERT WESLEY HOGE.

REFERENCES CITED

The following references are of record in the file of this patent:

UNITED STATES PATENTS

| Number | Name | Date |
|---|---|---|
| 2,040,196 | Berrisford | May 12, 1936 |
| 2,206,337 | Steele | July 2, 1940 |
| 2,233,432 | Schramm | Mar. 4, 1941 |
| 2,257,157 | Connolly | Sept. 30, 1941 |
| 2,271,318 | Thomas et al. | Jan. 27, 1942 |
| 2,272,301 | Kinneberg et al. | Feb. 10, 1942 |
| 2,311,979 | Corson | Feb. 23, 1943 |
| 2,325,611 | Keranen | Aug. 3, 1943 |
| 2,342,856 | Hall | Feb. 29, 1944 |
| 2,350,508 | Hemminger | June 6, 1944 |
| 2,350,730 | Degnen | June 6, 1944 |
| 2,355,016 | Stein | Aug. 1, 1944 |
| 2,376,139 | Hemminger | May 15, 1945 |
| 2,409,751 | Gerhold et al. | Oct. 22, 1946 |
| 2,420,542 | Jahnig | May 13, 1947 |
| 2,430,015 | Hatton et al. | Nov. 4, 1947 |
| 2,433,798 | Voorhees | Dec. 30, 1947 |
| 2,437,352 | Fragen | Mar. 9, 1948 |

OTHER REFERENCES

Gaudin: "Principles of Mineral Dressing," 1st edition (1939), McGraw-Hill Book Co., New York, pages 227–228.